(12) United States Patent
Miyake

(10) Patent No.: US 7,532,815 B2
(45) Date of Patent: May 12, 2009

(54) LENS UNIT, METHOD OF IDENTIFYING CHARACTERISTICS THEREOF AND METHOD OF JUDGING DETERIORATION THEREOF, AND DIGITAL CAMERA

(75) Inventor: Izumi Miyake, Saitama (JP)

(73) Assignee: Fujifilm Corporation, Tokyo (JP)

( * ) Notice: Subject to any disclaimer, the term of this patent is extended or adjusted under 35 U.S.C. 154(b) by 450 days.

(21) Appl. No.: 11/359,522

(22) Filed: Feb. 23, 2006

(65) Prior Publication Data
US 2006/0193621 A1 Aug. 31, 2006

(30) Foreign Application Priority Data
Feb. 25, 2005 (JP) ............................. 2005-050350

(51) Int. Cl.
G03B 17/14 (2006.01)
G03B 17/18 (2006.01)
G03B 43/00 (2006.01)
(52) U.S. Cl. ................... 396/287; 396/291; 396/529; 348/231.3; 348/231.6; 348/333.02; 348/333.04; 348/360
(58) Field of Classification Search ................. 396/71, 396/72, 88, 287, 291, 529; 348/231.3, 231.6, 348/360, 333.02, 333.04
See application file for complete search history.

(56) References Cited

U.S. PATENT DOCUMENTS

| 4,860,113 | A | * | 8/1989 | Miyamoto et al. | ........... 348/187 |
| 4,984,001 | A | * | 1/1991 | Himuro | ........................ 396/88 |
| 7,148,928 | B2 | * | 12/2006 | Minakuti et al. | ............ 348/360 |

FOREIGN PATENT DOCUMENTS

| JP | 8-171130 A | 7/1996 |
| JP | 11-346325 A | 12/1999 |

* cited by examiner

Primary Examiner—W. B. Perkey
(74) Attorney, Agent, or Firm—Birch, Stewart, Kolasch & Birch, LLP

(57) ABSTRACT

A digital camera is constituted of a camera body and a lens unit. The lens unit is removably attached to the camera body. When the lens unit is attached to the camera body, they are electrically connected through connection terminals. A non-volatile memory in the lens unit previously stores a chart image that is obtained by capturing a resolving power chart representing image resolving power by a CCD. When an attachment detector of the camera body detects that the lens unit is attached to the camera body, the chart image is transferred into the camera body and is displayed on a LCD.

7 Claims, 10 Drawing Sheets

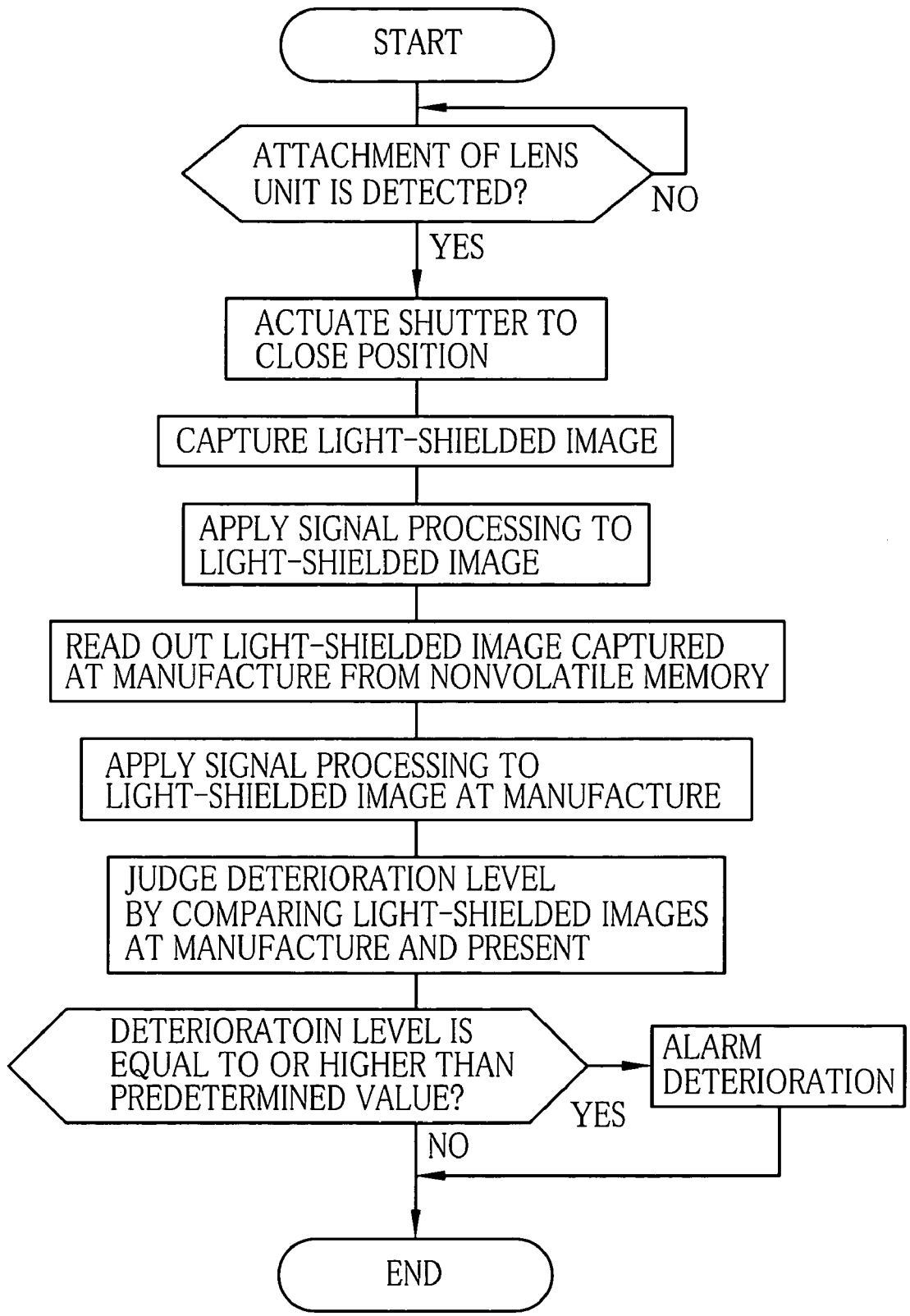

LENS UNIT, METHOD OF IDENTIFYING CHARACTERISTICS THEREOF AND METHOD OF JUDGING DETERIORATION THEREOF, AND DIGITAL CAMERA

BACKGROUND OF THE INVENTION

1. Field of the Invention

The present invention relates to a lens-interchangeable digital camera and a lens unit, a method of identifying characteristics of the lens unit and a method of judging deterioration of the lens unit.

2. Description of the Related Arts

Recently, there is a widespread use of digital cameras that record digital image data in a recording medium such as a built-in memory or a memory card. In such digital cameras, an image captured by an imaging device such as a CCD is converted into the digital image data. There are two types of the digital camera: one is an all-in-one type in which a taking lens is integrated with a camera body, and the other is a lens-interchangeable type in which one of various taking lenses is removably attached to the camera body.

Many of the lens-interchangeable cameras adopt existing systems for traditional silver halide cameras (see Japanese Patent Laid-Open Publication No. 8-171130). That is, they generally utilize interchangeable lenses for the silver halide cameras with little modification, and have a configuration in which a subject image is focused on an imaging device incorporated in a camera body, instead of using a silver halide photographic film, and image data is recorded in a recording medium.

However, since the imaging device becomes small and its resolving power is improved these days, a digital camera having a new system is considered rather than using the existing systems of the silver halide cameras. For example, a digital camera disclosed in Japanese Patent Laid-Open Publication No. 11-346325 has not only an interchangeable lens but also an interchangeable imaging module with imaging devices arranged therein.

As another new system for the lens-interchangeable digital cameras, it is considered that the imaging device is incorporated in the interchangeable lens. For this configuration, it is only necessary to connect the interchangeable lens to the camera body electrically without connecting them optically. Therefore, the structure can be relatively simplified.

In the lens-interchangeable digital camera, however, it is necessary to check captured images by doing a test shoot after the interchangeable lens is attached to the camera body, in order to obtain characteristics of each lens. Accordingly, it has been a problem that a user cannot know what kind of images can be obtained with the interchangeable lens, which is going to be used. Moreover, in the system in which the imaging device is incorporated in the interchangeable lens, the characteristics including resolving power of the imaging device, a range of zoom magnification and a field angle in macro capturing are different from each interchangeable lens. However, there has been no device that facilitates instant identification of these characteristics. In the digital camera described in the Japanese Patent Laid-Open Publication No. 11-346325, when the imaging module is exchanged, information relating to the imaging devices, a control program, and the like are sent to the camera body. However, the characteristics of the lens cannot be identified.

In addition, in the conventional lens-interchangeable digital camera, it is difficult to confirm performance deterioration of the imaging device even when quality of the captured image is degraded due to the performance deterioration of the imaging device with time.

SUMMARY OF THE INVENTION

An object of the present invention is to provide a digital camera and a lens unit capable of informing a user of characteristics of an interchangeable lens and performance deterioration of an imaging device when the interchangeable lens is attached to a camera body, and a method of identifying characteristics of the lens unit and a method of judging deterioration of the lens unit.

In order to achieve the above and other objects, a digital camera of the present invention includes electrical connectors, an attachment detector, a nonvolatile memory, a controller, a signal processor and a display. The nonvolatile memory is provided in a lens unit, whereas the attachment detector, the controller, the signal processor and the display are provided in a camera body. The electrical connectors electrically connect the lens unit and the camera body. The attachment detector detects that the lens unit is attached to the camera body. The nonvolatile memory stores characteristics information related to characteristics of the lens unit. When the lens unit is attached to the camera body, the characteristics information is readout from the nonvolatile memory, and is processed in the signal processor to be displayed as an information image on the display.

In a preferable embodiment of the present invention, the characteristics information is a chart image. This chart image is obtained by capturing a resolving power chart representing image resolving power by the imaging device at the time of manufacturing the lens unit, and is stored in the nonvolatile memory. When the lens unit is attached to the camera body, the chart image is read out from the nonvolatile memory and is displayed on the display.

In another preferable embodiment of the present invention, the lens unit includes a zoom lens and a moving mechanism that moves the zoom lens for zooming. The characteristics information includes information about the zoom lens's focal distance, and a chart image. When the lens unit is attached to the camera body, the chart image is electronically varied to a size based on the information about the focal distance and is displayed on the display.

In the other preferable embodiment of the present invention, the lens unit includes a light-shielding member, a deterioration judgment unit and an alarm unit. The deterioration judgment unit and the alarm unit are provided in the camera body. The light-shielding member moves between a close position for shielding the image device from light and an open position for retracting from the imaging device. The nonvolatile memory stores either a light-shielded image or a chart image, as a standard image. The light-shielded image is captured by the imaging device at manufacture of the lens unit while the shielding member is set in the close position. When the attachment detector detects that the lens unit is attached to the camera body, the light-shielding member is set in the close position by the controller, and a present light-shielded image is captured by the imaging device. Deterioration level of the imaging device is judged by comparing the present light-shielded image and the standard image. When the deterioration level of the imaging device is equal to or higher than a predetermined value, the alarm unit alarms accordingly.

A method of identifying characteristics of a lens unit according to the present invention includes the steps of detecting that a lens unit is attached to a camera body; transferring characteristics information stored in a nonvolatile memory into the camera body; and displaying an information image based on the characteristics information on a display.

A method of judging deterioration of a lens unit according to the present invention includes the steps of transferring a present light-shielded image, which is captured by an imaging device while a light-shielding member is set in a close position, into a camera body; transferring a standard image, which is either a light-shielded image at manufacture or a chart image, from a nonvolatile memory into the camera body; judging deterioration level of the imaging device by comparing the present light -shielded image and the standard image; and alarming when the deterioration level of the imaging device is judged to be equal to or higher than a predetermined value.

According to the present invention, when the lens unit is attached to the camera body, the characteristics information of the lens unit is transferred from the nonvolatile memory into the camera body, and the information image based on the characteristics information is displayed on the display. Owing to this, the characteristics of the lens unit can be identified from this information image, before capturing images.

According to the present invention, when the lens unit is attached to the camera body, the chart image that is the resolving power chart captured by the imaging device is displayed on the display. Owing to this, the resolving power of the lens unit can be immediately identified.

According to the present invention, when the lens unit is attached to the camera body, the chart image that is electronically varied to the size based on the information about the focal distance is displayed as the information image on the display. Owing to this, zoom magnification of the lens unit can be immediately identified.

According to the present invention, the deterioration level of the imaging device is judged by comparing the standard image readout from the nonvolatile memory and the present light-shielded image. Owing to this, the deterioration level of the imaging device can be easily identified when the lens unit is attached to the camera body.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 11 is a flow chart for judging deterioration level of a CCD.

DETAILED DESCRIPTION OF THE PREFERRED EMBODIMENTS

Figure 1:
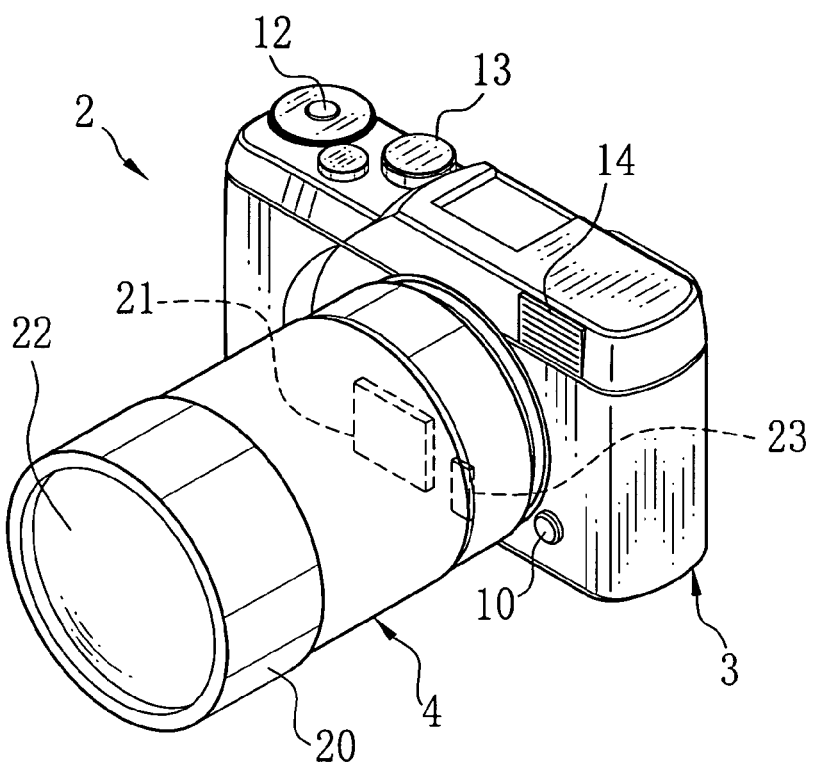
FIG. 1 is a perspective view of a digital camera to which a lens unit is attached.
Figure 2:
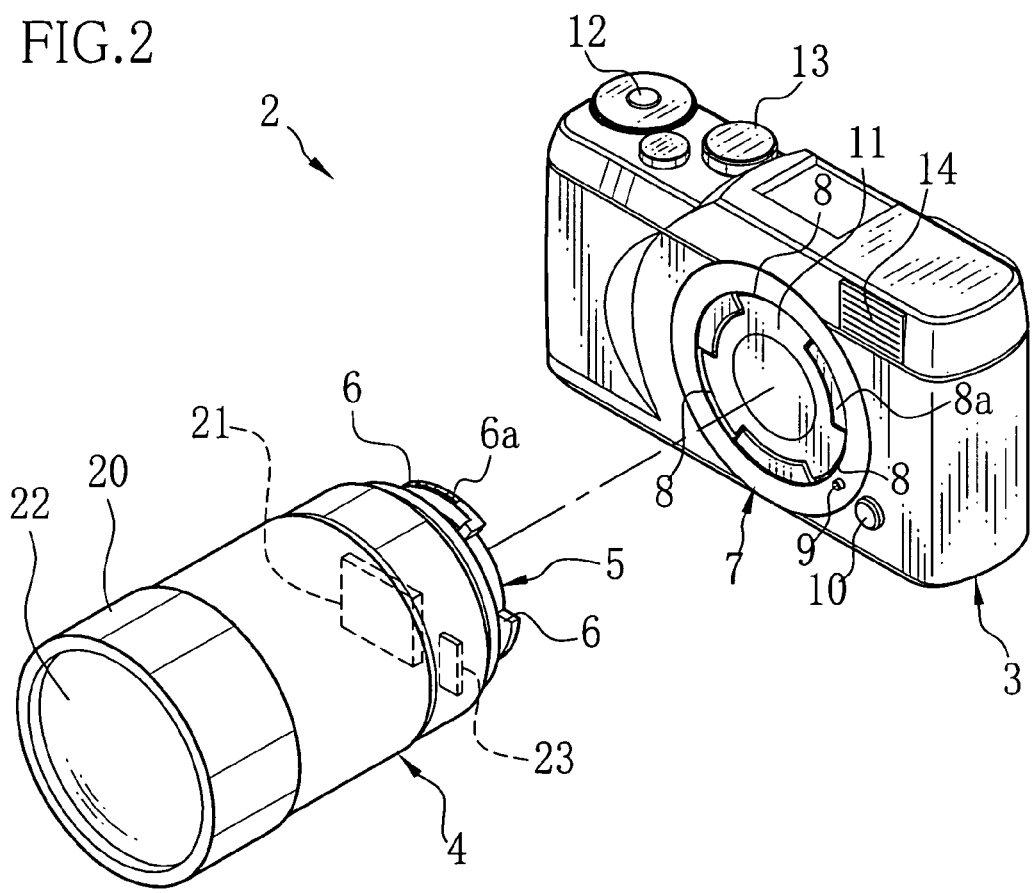
FIG. 2 is a perspective view of the digital camera from which the lens unit is removed.

As shown in FIGS. 1 and 2, a digital camera 2 is constituted of a camera body 3 and a lens unit 4, which is removably attached to the camera body 3. When the lens unit 4 is attached to the camera body 3, they are connected electrically.

A lens side mount portion 5 provided on a rear surface of the lens unit 4 is formed with bayonet claws 6. One of the bayonet claws 6 is provided with a connection terminal 6a. A body side mount portion 7 provided on a front surface of the camera body 3 is formed with a bayonet gap 8. When the lens unit 4 is attached to the camera body 3, the bayonet claws 6 are forced into the bayonet gap 8. The lens unit 4 is then rotated so as to engage the bayonet claws 6 and bayonet claws 8a. When the lens unit 4 is rotated by a predetermined angle, a lock pin 9 of the mount portion 7 is engaged with a pin hole (not shown) of the mount portion 5, thereby positioning the lens unit 4. The connection terminal 6a is connected to a connection terminal 7a (see FIG.4) of the mount portion 7 when the lens unit 4 is positioned. A mount lid 11 biased forward by a spring is provided in the mount portion 7 to prevent dust from entering into the camera body 3 when the lens unit 4 is removed.

The body side mount portion 7 is provided with a lock release button 10, which is operated in cooperation with the lock pin 9. The lock release button 10 is operated to remove the lens unit 4. When the rock release button 10 is pressed, the lock pin 9 is moved backward, thereby releasing the lock.

Figure 3:
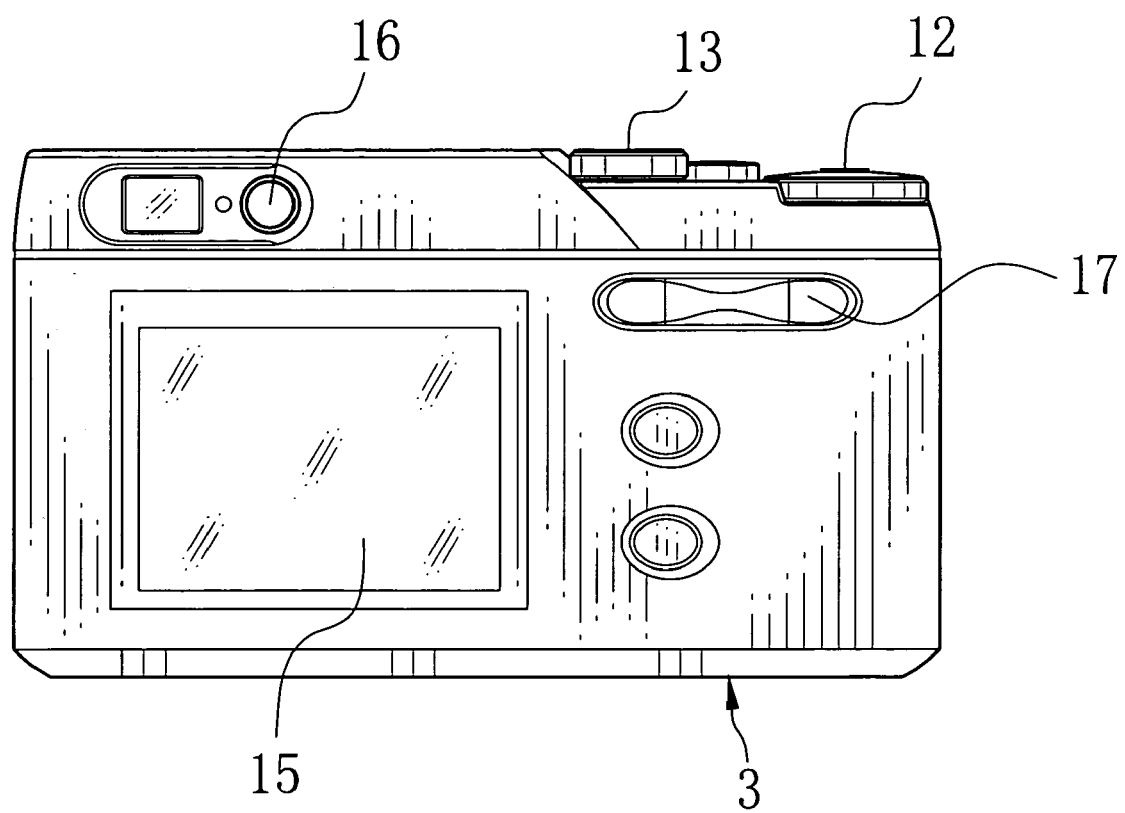
FIG. 3 is a rear view of the digital camera.

A release button 12 that is pressed for capturing images and a mode operating dial 13 that is operated for switching between a capture mode and a reproduction mode are provided on a top surface of the camera body 3. As shown in FIG. 3, an LCD 15 on which the captured image and various setting conditions are displayed, a power switch 16, and a zoom operating section 17 are provided on a rear surface of the camera body 3.

Referring back to the FIG. 2, A CCD (imaging device) 21, a taking lens 22, a nonvolatile memory 23 and so forth are provided in a cylindrical unit body 20.

Figure 4:
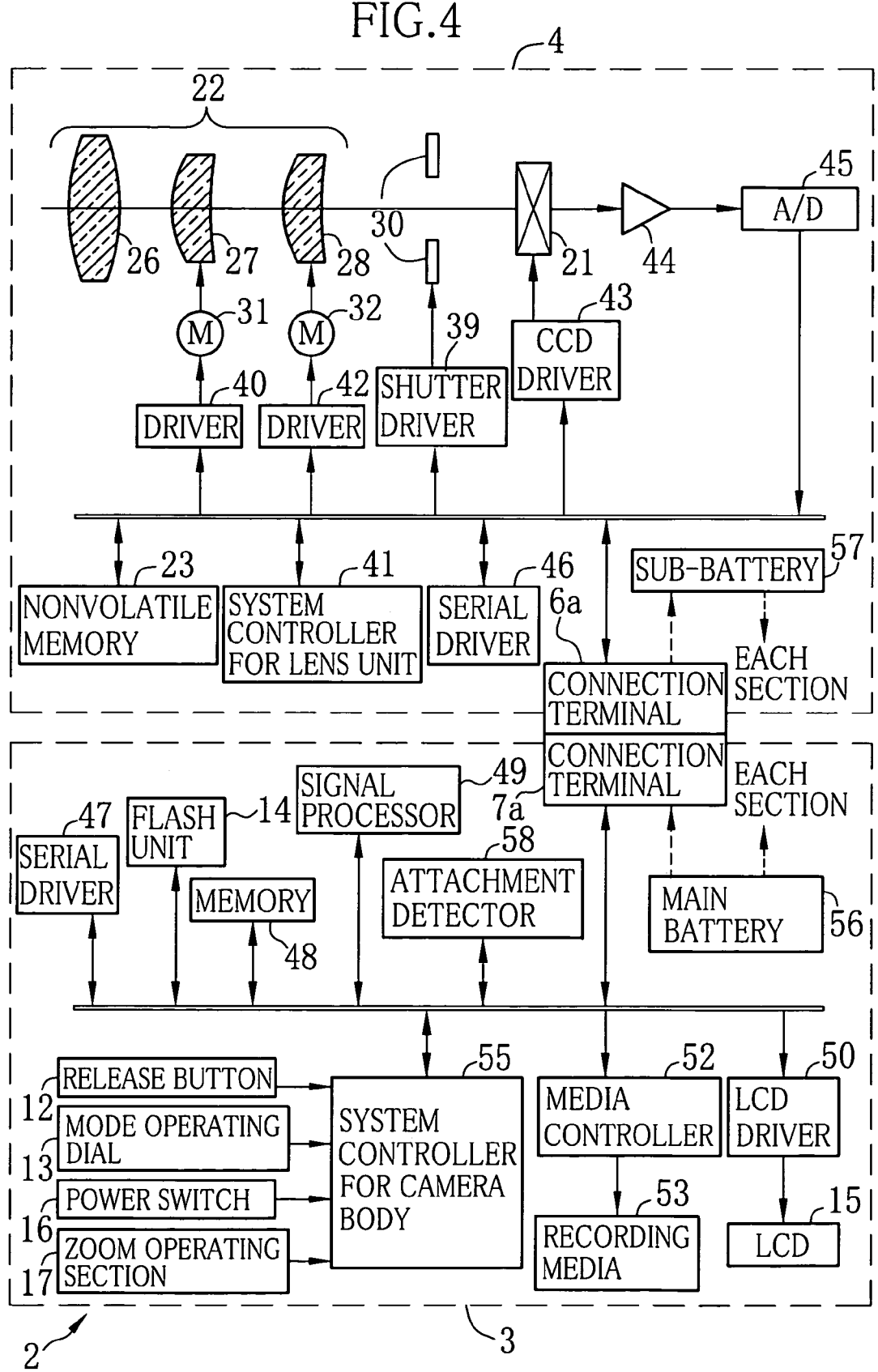
FIG. 4 is a block diagram illustrating an electrical structure of the digital camera.

In FIG.4, the taking lens 22 is constituted of lens groups 26, 27, and 28. The lens groups 27, 28 respectively function as a zoom lens and a focus lens, and are respectively moved by a zoom lens motor 31 and a focus lens motor 32. The CCD 21 is arranged behind the lens group 28. A shutter mechanism 30, an aperture stop mechanism (not shown) and so forth are arranged in front of the CCD 21. The shutter mechanism 30 is controlled by a shutter driver 39, and is varied between a close position for shielding the CCD 21 from light and an open position for retracting from the CCD 21.

The zoom lens motor 31 is connected to a zoom motor driver 40, and is controlled by a system controller 41 for the lens unit (hereinafter system controller 41) through the zoom motor driver 40. The focus lens motor 32 is connected to a focus motor driver 42, and is controlled by the system controller 41 through the focus motor driver 42.

The CCD 21 is connected to a CCD driver 43, and is controlled by the system controller 41 through the CCD driver 43. The CCD 21 converts an optical subject image into an electrical image signal to output. After being amplified to proper level by an amplifier 44, the image signal is digitally converted by an A/D converter 45 to image data. The image data is sent to the camera body 3 through a serial driver 46. The system controller 41 controls capturing processing of the lens unit 4 based on instructions from a system controller 55 for the camera body (hereinafter system controller 55).

The image data from the lens unit 4 is written in a memory 48 through a serial driver 47. A signal processor 49 reads out the image data from the memory 48 and applies various kinds of image processing including gradation conversion, white balance correction and γ-correction to the image data. The image data to which the image processing is applied is input in an LCD driver 50 to be displayed on the LCD 15 as a through image. When the mode operating dial 13 is operated to select the reproduction mode, the image recorded in a recording media 53 or setting conditions for image capturing is displayed on the LCD 15.

When the release button 12 is pressed, the image data to which the image processing has been applied is recorded in the recording media 53 by the media controller 52. At the same time, a flash unit 14 is driven in accordance with brightness of the subject. The system controller 55 sends the instructions to the system controller 41, and also controls the camera body for the capturing processing, image displaying processing, recording processing, and so forth. The release button 12, the mode operating dial 13, the power switch 16, and the zoom operating section 17 are connected to the system controller 41. When the zoom operating section 17 is operated, the zoom lens group 28 is moved forward and backward to perform zooming.

A main battery 56 is provided in the camera body 3 to supply electric power to each section of the camera body 3. The lens unit 4 is provided with a sub-battery 57. The main battery 56 and the sub-battery 57 are connected with each other through the connection terminals 6a, 7a of the mount portions 5, 7. The electric power is supplied from the main battery 56 to the sub-battery 57, and then is supplied from the sub-battery 57 to each section of the lens unit 4.

An attachment detector 58 for detecting the attachment of the lens unit 4 is provided in the camera body 3. When the attachment detector 58 is electrically connected to the lens unit 4 through the connection terminals 6a, 7a, it detects electrical potentials of the connection terminal 6a. The attachment detector 58 then sends information that the lens unit 4 is attached to the camera body 3 to the system controller 41.

Figure 5:
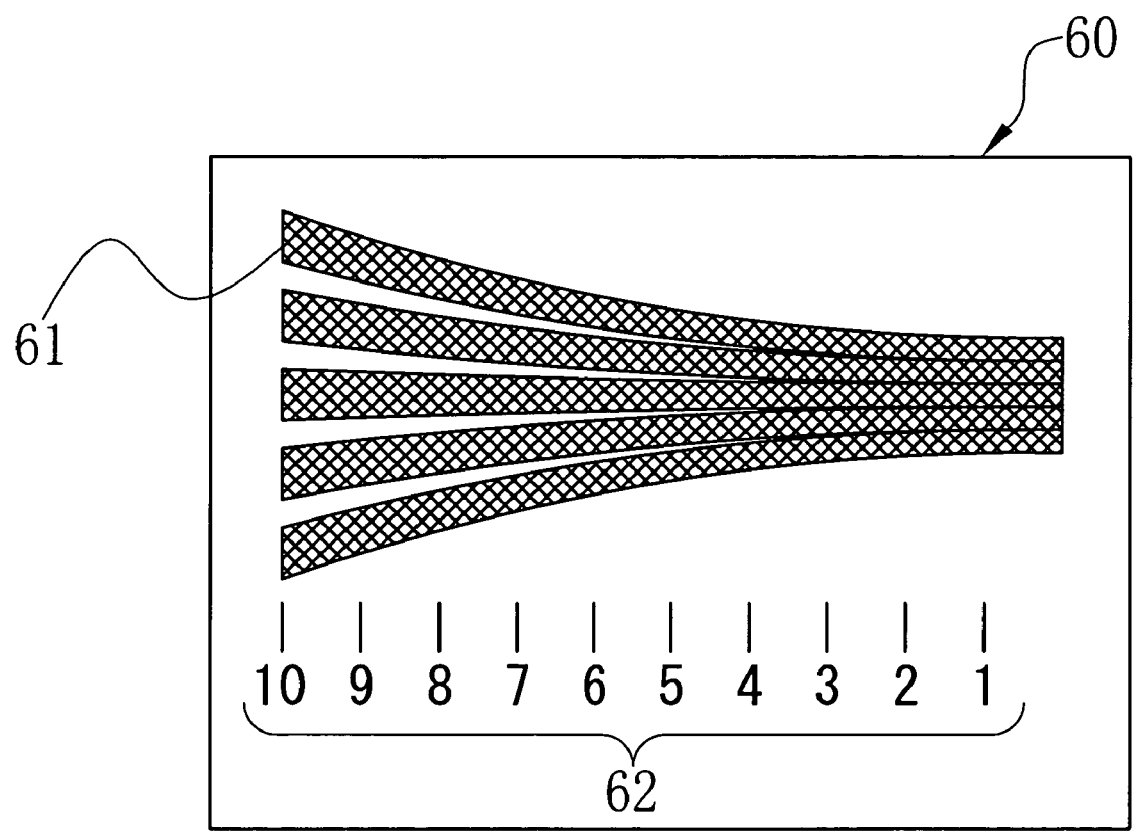
FIG. 5 is an explanatory view illustrating a resolving power chart.

The nonvolatile memory 23 provided in the lens unit 4 previously stores a chart image. The chart image of the present embodiment is an image obtained by capturing, for instance, a resolving power chart 60 as shown in FIG. 5 by the CCD 21, and it represents image resolving power of the lens unit 4. The resolving power chart 60 is called a wedge chart. In the wedge chart 61, five black belts and four white belts respectively having the identical width are arranged alternately in a lateral (horizontal) direction. Below the wedge chart 61, a scale 62 is arranged. When the image of the resolving power chart 60 is checked, it is possible to observe a limit line at which the black and white belts are accurately resolved. That it, a numeric value of the resolving power shown by the limit line can be read by the scale 62. When the numeric value of the scale 62 is high, the resolving power of the CCD 21 is also high. As the chart image, an image of a general landscape or a chart image in conformity with the ISO (International Organization for Standardization) standards and the standard of the Institute of Image Electronics Engineers of Japan may be used.

Figure 6:
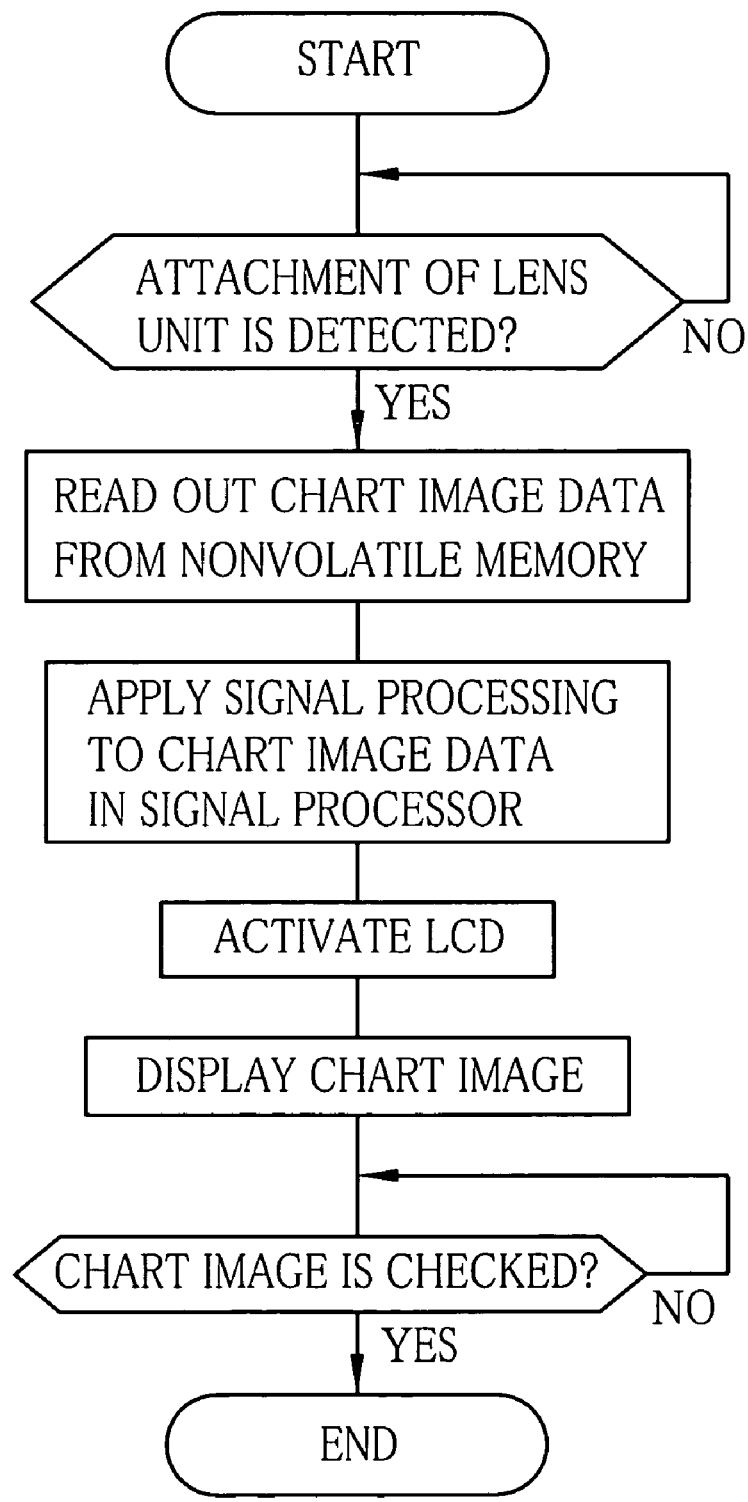
FIG. 6 is a flow chart for displaying information about resolving power.

Next, the operation according to the first embodiment is explained with referring to FIG. 6. When the lens unit 4 is attached to the camera body 3, they are electrically connected to each other. When the power switch 16 of the camera body 3 is turned on, the attachment detector 58 detects whether the lens unit 4 is attached. When the attachment detector 58 detects that the lens unit 4 is attached to the camera body 3, the system controller 55 reads out the chart image from the nonvolatile memory 23 of the lens unit 4 through the system controller 41 to perform signal processing in the signal processor 49. Then, the LCD 15 is activated, and the chart image is displayed thereon. A user can identify the resolving power as the characteristics of the lens unit 4 by observing the chart image on the LCD 15. In this way, the user can know the characteristics of the lens unit 4 by identifying types of the lens unit 4 before capturing images, therefore the user can predict the image to be obtained by the lens unit 4, which is going to be used.

Figure 7:
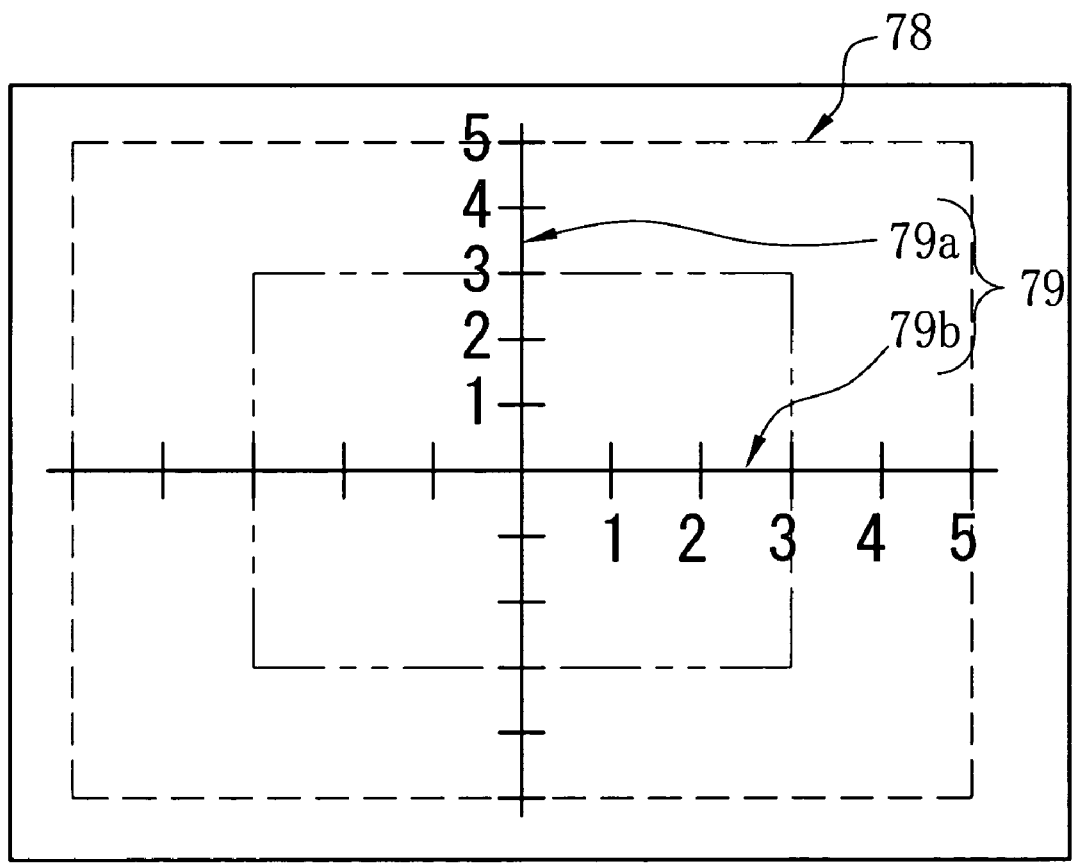
FIG. 7 is an explanatory view illustrating a chart showing information about zoom magnification.

According to the present invention, it is also possible that the digital camera 2 notifies the zoom magnification that is the characteristics of the lens unit 4 before capturing images. In the second embodiment of the present invention, the nonvolatile memory 23 previously stores respective focal distance information about the taking lens 22 moved to a telephoto side and to a wide side at the time of zooming with the lens unit 4, and a chart image captured by the CCD 21. The chart image of the present embodiment is an image obtained by capturing, for instance, a chart 78 as shown in FIG. 7 by the CCD 21. In the chart 78, a scale 79 having numbered longitudinal and lateral axes 79a, 79b is arranged with its origin located at the center of a screen. As the stored focal distance information, for example, the numeric value of the wide side is 34 mm, while that of the telephoto side is 102 mm.

Figure 8:
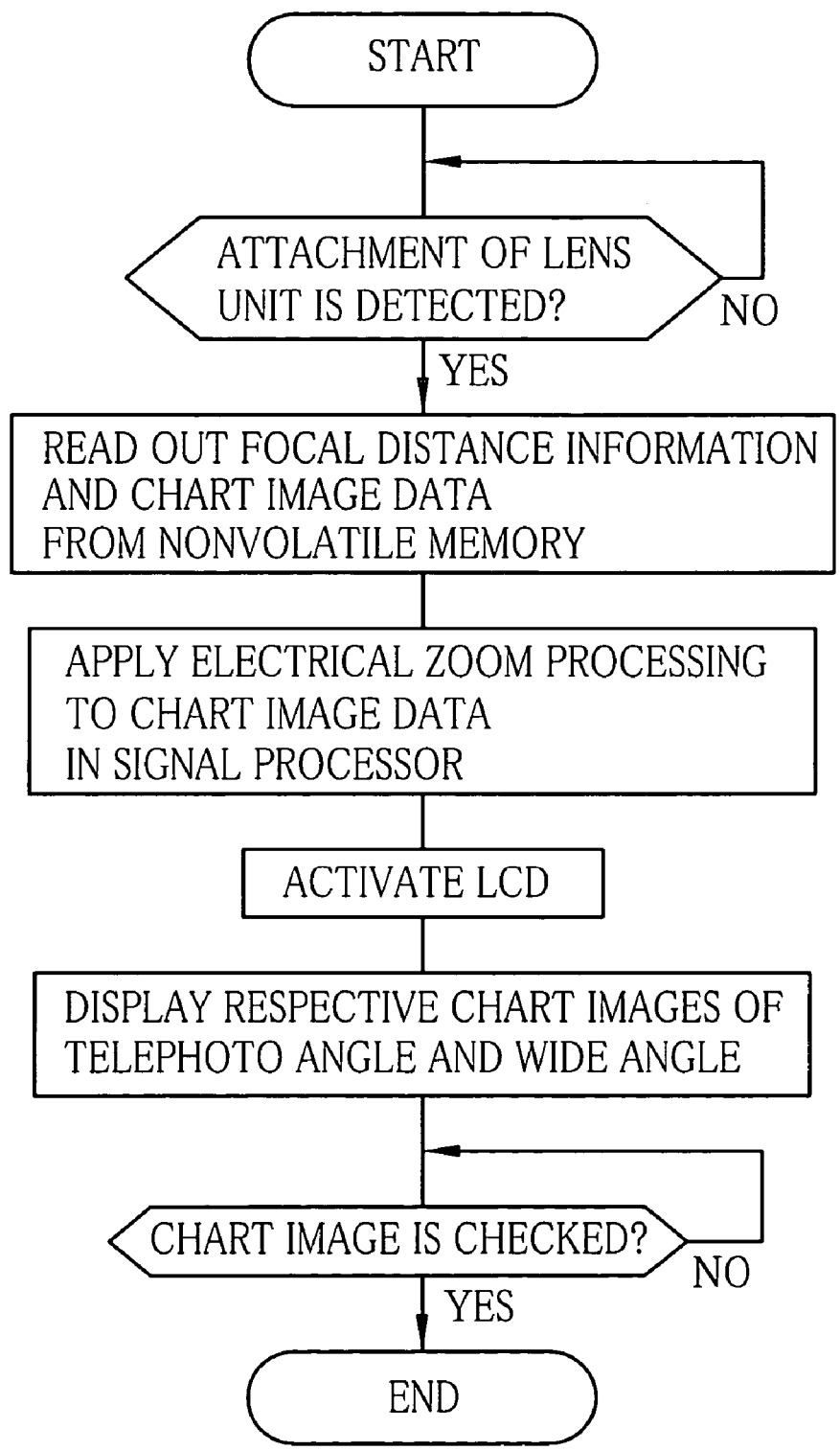
FIG. 8 is a flow chart for displaying the information about the zoom magnification.

Next, the operation according to the second embodiment is explained with referring to FIG. 8. When the lens unit 4 is attached to the camera body 2, the system controller 55 reads out the chart image and the focal distance information of the taking lens 22 from the nonvolatile memory 23 of the lens unit 4 through the system controller 41 to perform signal processing in the signal processor 49. Then, the chart image is electronically varied to a size based on the focal distance information to be displayed on the LCD 15. That is, the chart image in which the lens unit 4 is moved to the telephoto side is displayed on the LCD 15 in accordance with the focal distance information of the taking lens 22 at the telephoto side and the image signal of the chart image. The chart image displayed on the LCD 15 is, for example, a range surrounded by a dashed line in FIG. 7 including the largest numeric value "5". Then, the chart image in which the lens unit 4 is moved to the wide side is displayed on the LCD 15 in accordance with the focal information of the taking lens 22 at the wide side and the image signal of the chart image. At this time, the chart image displayed on the LCD 15 is, for example, a range surrounded by a chain-double dashed line in FIG. 7. This chart image contains only a part of the original chart image cropped through an electrical zoom processing, and includes the numeric value "3" and less. The user can identify the variable range of the magnification in zooming with the lens unit 4 by observing the chart image on the LCD 15. Thus the user can know the characteristics including the zoom magnification of the lens unit 4 before capturing images. After checking the chart image, the mode operating dial 13 is operated to switch the mode to the capture mode or the reproduction mode.

Although the second embodiment uses the lens unit having the zooming function and the zoom magnification is informed to the user, it is also possible to use a lens unit having a macro-function. In this case, each focal distance information of normal capturing and macro capturing, and the chart image are previously stored in the nonvolatile memory. The image signals of the focal distance information and the chart image are processed in the signal processor 49, and the chart images in the normal capturing and in the macro capturing are displayed on the LCD 15 sequentially.

Figure 9:
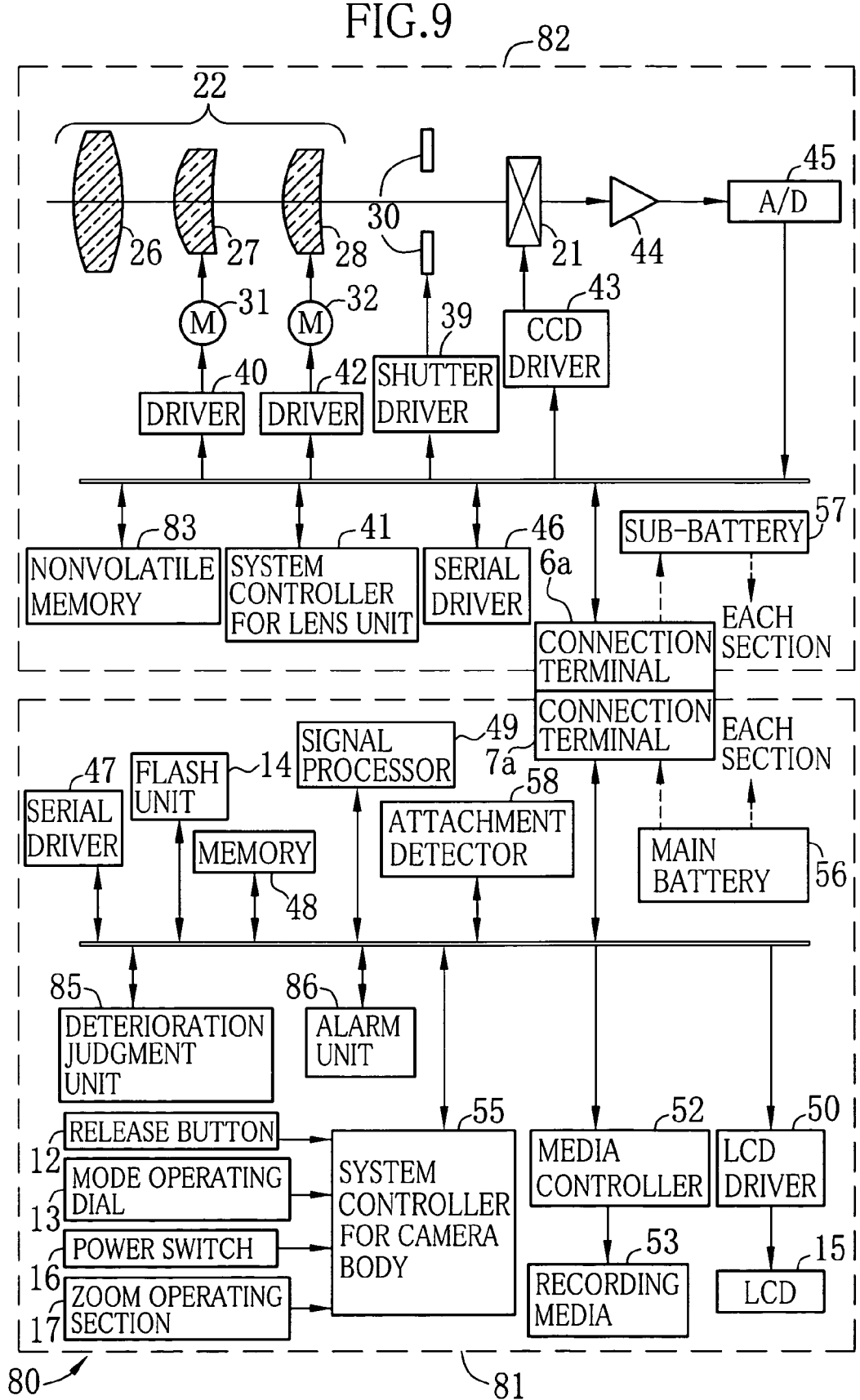
FIG. 9 is a block diagram illustrating an electrical structure of the digital camera in a different embodiment.

In the first and second embodiments, the user is informed of the characteristics information about the lens unit stored in the nonvolatile memory when the lens unit is attached to the camera body, so that they can identify the types of the lens unit. Meanwhile, in a third embodiment descried later, performance deterioration of the CCD with time is detected when the lens unit is attached to the camera body so as to inform the user accordingly. In FIG. 9, a camera body 80 is constituted of a camera body 81 and a lens unit 82. In FIG. 9, the components identical to those in the first embodiment shown in FIG. 4 are represented by same numerals, and explanations of them are omitted.

In the first and second embodiments, the user is informed of the characteristics information about the lens unit stored in the nonvolatile memory when the lens unit is attached to the camera body, so that they can identify the types of the lens unit. Meanwhile, in a third embodiment descried later, performance deterioration of the CCD with time is detected when the lens unit is attached to the camera body so as to inform the user accordingly. In FIG. 9, a camera body 80 is constituted of a camera body 81 and a lens unit 82. In FIG. 9, the components identical to those in the first embodiment shown in FIG. 4 are represented by same numerals, and explanations of them are omitted.

Figure 10:
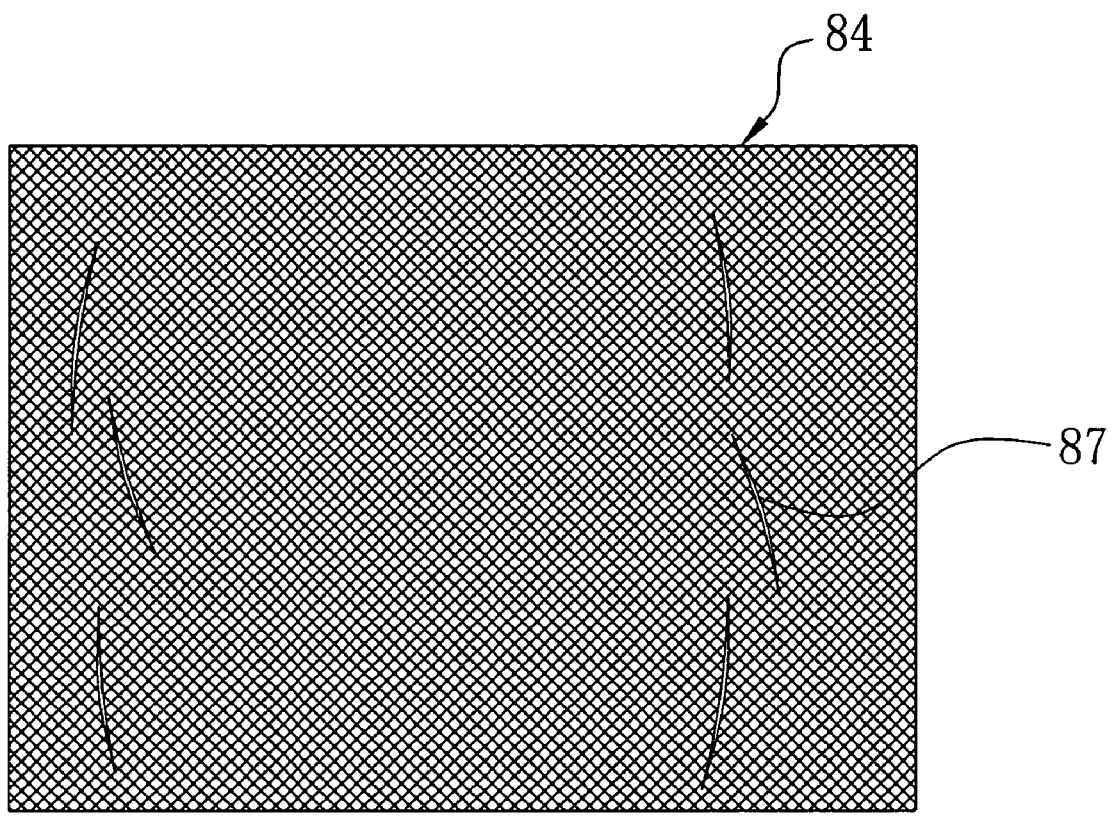
FIG. 10 is an explanatory view illustrating a light-shielded image.

A light-shielded image 84 as shown in FIG. 10 is previously stored as a standard image in a nonvolatile memory 83 provided in the lens unit 82. Since the light-shielded image 84 is captured by the CCD 21 by actuating the shutter mechanism to the close position at the time of manufacturing the lens unit 82, the entire image appears almost black. White portions 87 are flaws on the CCD. The camera body 81 is provided with a deterioration judgment unit 85 for judging the deterioration level of the CCD 21, and an alarm unit 86 for alarming when the deterioration judgment unit 85 judges that the deterioration level of the CCD 21 is equal to or higher than a predetermined value.

Next, the operation according to the third embodiment is explained with referring to FIG. 11. When the lens unit 82 is attached to the camera body 81, they are electrically connected to each other. When the power switch 16 of the camera body 81 is turned on, the attachment detector 58 detects whether the lens unit 82 is attached. When the attachment of the lens unit 82 is detected, the system controller 55 activates the system controller 41 in the lens unit 82, and controls the shutter driver 39 to actuate the shutter mechanism 30 to the close position. In the close position state, a present light-shielded image is captured by the CCD 21. The image signal of the present light-shielded image, which is captured at the time of the attachment of the lens unit 82, is sent to the signal processor 49 to be processed. The system controller 55 retrieves the image signal of the light-shielded image 84 at manufacture from the nonvolatile memory 83 to apply the signal processing thereto in the signal processor 49. The light-shielded images at manufacture and present, which are transferred into the system controller 55, are sent to the deterioration judgment unit 85. The deterioration judgment unit 85 judges the deterioration level of the CCD 21 by comparing light-shielded images at manufacture and present. For instance, the light-shielded images at manufacture and present are respectively converted into an image binarized into white and black, and compared with each other. Thereby, the flaws on the CCD 21 are represented as the white portions 87, while the other portion is represented in black, as shown in FIG. 10. When area ratio of the white portions increased in the present light-shielded image as compared to the light-shielded image 84 at manufacture exceeds a predetermined threshold value, the deterioration judgment unit 85 judges that the CCD 21 is deteriorated, and sends a judgment result to the alarm unit 86. Based on the judgment result, the alarm unit 86 reads out an alarm image showing the deterioration of the CCD 21 from the memory 48 to display it on the LCD 15.

In the third embodiment, although the deterioration level of the CCD is judged according to the dimension of the white portions 87, it is also possible to judge the deterioration level according to a degree of shading or color shading (color unevenness). In this case, as well as the third embodiment, light-shielded images at manufacture and present are compared. When the degree of the shading, which is a decrease of light amount around the perimeter of a screen as compared to the center thereof, is compared, a brightness ratio of the perimeter of the screen to that of the center of the screen is calculated in both of the light-shielded images at manufacture and present. When the brightness ratio of the present light-shielded image has decreased from that of the light-shielded image at manufacture to the extent of, for example, more than a predetermined threshold value, the CCD is judged to be deteriorated. When the degree of the color shading, which is a change in color tone around the perimeter of the screen as compared to the center thereof, is compared to judge the deterioration of the CCD, a color tone ratio of the perimeter of the screen to that of the center of the screen in each R, G and B is calculated in both of the light-shielded images at manufacture and present. When the color tone ratio of the present light-shielded image has changed from that of the light-shielded image at manufacture to the extent of, for example, more than a predetermined threshold value, the CCD is judged to be deteriorated.

In the third embodiment, although the light-shielded image at manufacture is previously captured and stored in the nonvolatile memory 83, it is also possible to store an image in which the entire screen is dark (the brightness is low) in the nonvolatile memory as the chart image. In this case, the chart is formed on a rear surface of the shutter or the light-shielding member. Additionally, although the alarm image is displayed on the LCD in the third embodiment, it is also possible to make sound for alarming or to make an LED emit light for alarming.

Moreover, in the third embodiment, although the shutter mechanism shields the CCD from light to obtain the light-shielded image, it is also possible to provide a light-shielding mechanism for capturing the light-shielded image.

In the above embodiments, the lens-interchangeable digital camera in which the lens unit is removably attached to the camera body is used. However, the present invention can also be applied to a digital camera with an interchangeable imaging module composed of a CCD (imaging device) and a driving circuit for the CCD. Moreover, the present invention can be also applied to various types of cameras like a video camera, besides the digital camera. Furthermore, it is possible that the lens unit and the camera body are configured to communicate image signals by radio.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera constituted of a lens unit having a taking lens and an imaging device incorporated therein, and a camera body to which said lens unit is removably attached, said digital camera comprising:

electrical connectors for electrically connecting said lens unit and said camera body when said lens unit is attached to said camera body;

a nonvolatile memory provided in said lens unit, for previously storing characteristics information related to characteristics of said lens unit;

an attachment detector provided in said camera body, for detecting that said lens unit is attached to said camera body;

a controller provided in said camera body, for transferring said characteristics information from said nonvolatile memory through said electrical connectors into said camera body when said attachment detector detects that said lens unit is attached to said camera body;

a signal processor provided in said camera body, for processing said characteristics information; and a display provided in said camera body, for displaying an information image based on said characteristics information that is processed in said signal processor, wherein said characteristics information is resolving power chart information, said resolving power chart representing image resolving power.

2. A digital camera as claimed in claim 1, wherein said resolving power chart information is a chart image that is captured by said imaging device at manufacture of said lens unit, said chart image being displayed as said information image on said display when said lens unit is attached to said camera body.

3. A digital camera constituted of a lens unit having at least an imaging device incorporated therein, and a camera body to which said lens unit is removably attached, said digital camera comprising:

electrical connectors for electrically connecting said lens unit and said camera body when said lens unit is attached to said camera body;

an attachment detector provided in said camera body, for detecting that said lens unit is attached to said camera body;

a light-shielding member located in front of said imaging device, for moving between a close position for shielding said imaging device from light and an open position for retracting from said imaging device;

a nonvolatile memory provided in said lens unit, for previously storing a light-shielded image or a chart image as a standard image;

a controller provided in said camera body, for transferring a present light-shielded image and said standard image that is stored in said nonvolatile memory into said camera body through said electrical connectors when said attachment detector detects that said lens unit is attached to said camera body, said present light-shielded image being captured by said imaging device with said light-shielding member being set in said close position;

a deterioration judgment unit provided in said camera body, for judging deterioration level of said imaging device by comparing said standard image and said present light-shielded image; and an alarm unit provided in said camera body, for alarming when said deterioration level of said imaging device is judged to be equal to or higher than a predetermined value.

4. A lens unit having a taking lens and an imaging device incorporated therein, and removably attached to a camera body, said lens unit comprising:

a nonvolatile memory for previously storing characteristics information related to characteristics of said lens unit, said characteristics information being transferred into said camera body wherein said characteristics information is an image of a resolving power chart captured by said imaging device.

5. A lens unit as claimed in claim 4, further comprising:

a zoom lens as said taking lens; and a moving mechanism that moves said zoom lens for zooming, wherein said characteristics information being information about said zoom lens's focal distance that is variable through said moving mechanism and a chart image that is captured by said imaging device.

6. A method of identifying characteristics of a lens unit, said lens unit having a taking lens and an imaging device incorporated therein, and removably attached to a camera body, said method comprising the steps of:

detecting that said lens unit is attached to said camera body;

transferring characteristics information related to characteristics of said lens unit that is stored in a nonvolatile memory of said lens unit into said camera body, and displaying an information image based on said characteristics information on a display provided in said camera body, wherein said characteristics information is a chart image that is obtained by capturing a resolving power chart representing image resolving power by said imaging device at manufacture of said lens unit, said chart image being displayed as said information image on said display when said lens unit is attached to said camera body.

7. A method of judging deterioration of a lens unit, said lens unit comprising an imaging device and a light-shielding member that is located in front of said imaging device and moves between a close position for shielding said imaging device from light and an open position for retracting from said imaging device, said lens unit being removably attached to a camera body, said method comprising the steps of:

detecting that said lens unit is attached to said camera body;

capturing a present light-shielded image by said imaging device with said light-shielding member being set in said close position;

judging deterioration level of said imaging device by comparing a standard image from a nonvolatile memory of said lens unit and said present light-shielded image, said standard image being either a light-shielded image that is captured by said imaging device at manufacture of said lens unit or a chart image; and alarming when said deterioration level of said imaging device is judged to be equal to or higher than a predetermined value.

* * * * *